Aug. 22, 1961     R. D. LOWRY ET AL     2,997,170
LAMINATES
Filed Dec. 16, 1959
FIG.1.
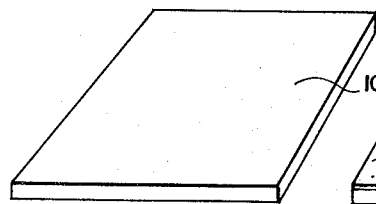
FIG.2.
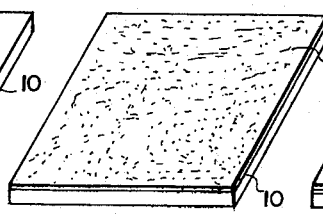
FIG.3.
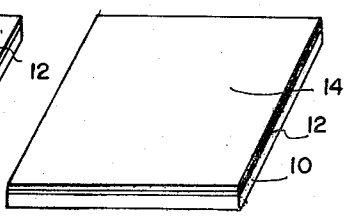
FIG.4.
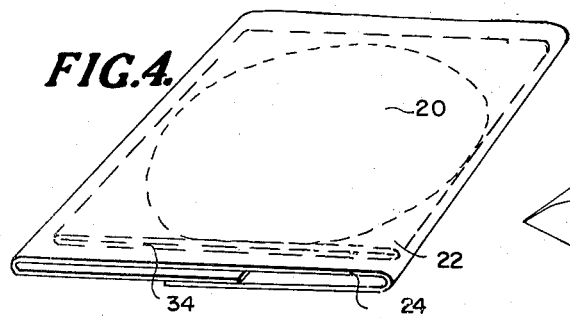
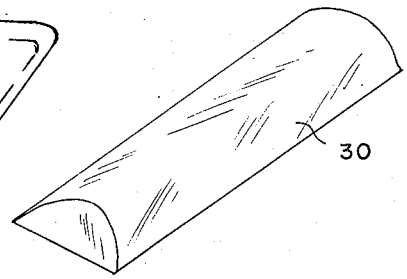
FIG.5.
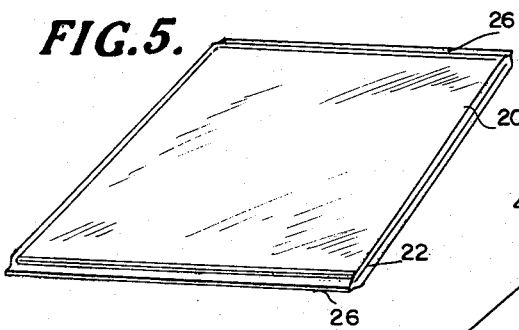
FIG.7.
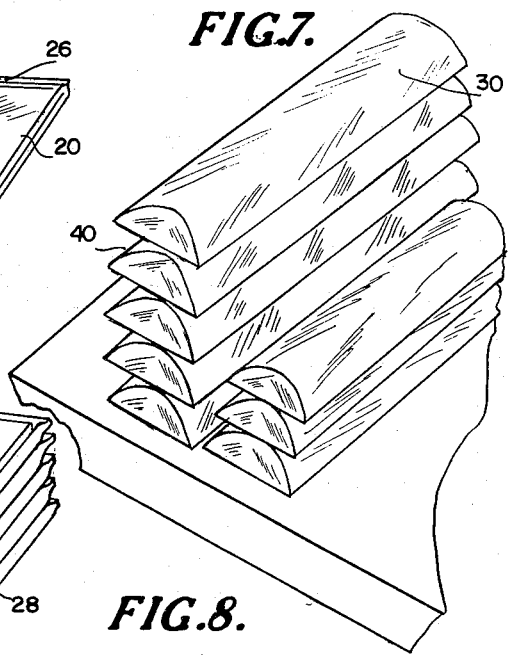
FIG.6.
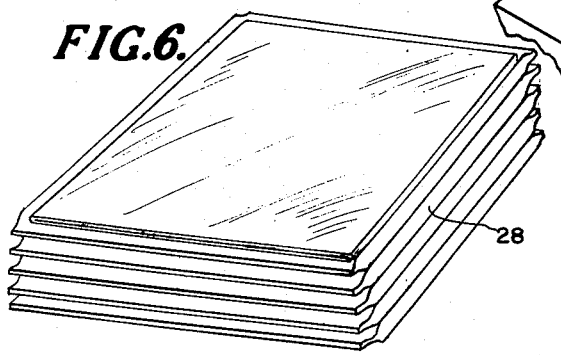
FIG.8.
INVENTORS
ROBERT D. LOWRY
JOHN W. HARRISON
BY *Cushman, Darby & Cushman*
ATTORNEY United States Patent Office 2,997,170
Patented Aug. 22, 1961

2,997,170
LAMINATES
Robert D. Lowry and John W. Harrison, Winchester,
Mass., assignors to W. R. Grace & Co., Cambridge,
Mass., a corporation of Connecticut
Filed Dec. 16, 1959, Ser. No. 860,040
1 Claim. (Cl. 206—65)

This invention relates to a new laminate and method of making same.

More particularly the invention relates to the use of a film of an irradiated polyethylene or irradiated polypropylene, i.e. an irradiated polymer of an olefin having 2 to 3 carbon atoms as a laminant for use as a surface protectant and decorative layer for materials such as paper, wood, metal, etc. to provide improved water and chemical resistance, scuff resistance, and high gloss.

An object of this invention, therefore, is to provide such an improved laminate.

Another object is to provide improved containers having wide commercial adaptation, which containers are made from the above-mentioned new laminate material.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention wil become apparent to those skilled in the art from this detailed description.

Many articles like phonograph records, stockings, candy, etc. are packaged in a relatively thin cardboard box or envelope. It has been found that such packages can be rendered tamper proof, dust proof, moisture resistant and provided with a high gloss, scuff resistant covering for improved shipping and handling characteristics by manufacturing the box or envelope from laminate stock which has been preprinted and had a surface lamination of a film such as irradiated polyethylene or irradiated polypropylene applied so as to have an excess of film extending beyond the cardboard edge in the area which will become the final closure.

It has been found possible to bond to paper, wood, and metal, a film of irradiated polyethylene or irradiated polypropylene with adhesives and to paper and metal with combined heat and pressure using care to restrict possible film shrinkage during cooling when biaxially oriented film is employed.

In a bonding operation, it is necessary to avoid bubbles and air pockets while laminating, or even the inclusion of a laminating agent which can release gas to cause similar protuberances in the plastic material.

Adaptations of this invention include laminations of irradiated polyethylene or polypropylene to covers of paper-backed books and packaging board, lamination to wood for table tops, etc., protection of metals from abrasion and chemical attack during manufacture and use. The irradiated polyethylene or polypropylene can be unoriented or monoaxially oriented. However, when advantage is to be taken of shrink characteristics it should be biaxially oriented.

In all of the specific examples there was employed Alathon 14 polyethylene which had been irradiated to an extent of $12 \times 10^6$ rad and had been biaxially oriented as disclosed in Colombian Patent 8,767 of April 22, 1959, to an extent of 350% longitudinally and 350% laterally and had a shrink energy of 250 p.s.i. at 96° C.

Example 1

A film of irradiated polyethylene film 1 mil thick was laminated by use of a clear adhesive, e.g. an epoxy resin such as bisphenol A-epichlorohydrin to an ordinary filing card. A generous amount of black ink was spilled upon the laminated card and it immediately formed a small globule which was very easily wiped off without leaving a trace of its presence.

Example 2

A second filing card laminated as that in Example 1 was heavily marked with a wax pencil. Rather than adhering and marring the film surface, the wax markings were found to be easily removable by merely wiping with a cellulose tissue.

Example 3

To test the abrasion resistance of the laminated film of Example 1, it was subjected to moderate hard pressure erasure strokes using a fiber glass typewriter eraser. It was found that at least fourteen strokes were needed to even slightly skin back the film.

As illustrative of the adaptability of this invention to the manufacture of containers or closures the following example was performed.

Example 4

An irradiated polyethylene film 1 mil thick was laminated by use of a clear adhesive i.e. bisphenol A-epichlorohydrin resin to a conventional printed record envelope in a manner such that a ¾ inch flap extended from either face past the opening of the cardboard envelope. After insertion of the record, the flaps were heat sealed using an impulse sealer which seals and cuts simultaneously so that the sealed and cut edge was about ¼ inch from the cardboard. To use the record, it is necessary to cut this seal. This provides both a guarantee of freshness and a dust seal of the highest quality. In addition it has the advantage of presenting a neat, crisp commercially attractive appearance.

In the instance where a thicker container or box is used in place of the record envelope, a bellows placket fold can easily be taken in the narrower dimensions of the protruding film and a subsequent seal made. This requires a somewhat greater film excess. Conveniently, it is also possible to use an overwrap closure and an ordinary heat seal on this end.

If a box, in fact, is used and backings or tucked end flaps are desired, the adhesive could be omitted from that area during the combining operation. Furthermore, certain types of boxes can have the seal at both ends if desired.

FIGURE 1 is a perspective view of a blank of material;

FIGURE 2 is a perspective view of a blank coated with an adhesive;

FIGURE 3 is a perspective view of a laminate material made in accordance with this invention;

FIGURE 4 is a perspective view within a film wrapper illustrating a step in the method embodying the invention;

FIGURE 5 is a perspective view of a complete article made in accordance with the process embodying the invention;

FIGURE 6 is a perspective view of a stack of complete articles made in accordance with this invention;

FIGURE 7 is a perspective view of a complete package of a piece of confectionery wrapped in accordance with this invention, and FIGURE 8 is a perspective view of a stack of complete articles made in accordance with this invention.

Referring in detail to the drawings, FIGURES 1–3 show an ordinary blank of paper, wood or metal 10 coated with an adhesive 12.

The blank 10 can be, for example, a filing card, a playing card, a metal plate or a wooden plaque, etc.

Laminated to the blank 10 by the adhesive 12 is a film of irradiated polyethylene 14.

FIGURES 4, 5 and 6 are perspective views which illustrate a record envelope 22 having a film of irradiated polyethylene laminated to the top and bottom surface thereof, generally indicated by numeral 20.

In FIGURE 4, a three-quarter inch flap 24 extends from both faces of the envelope beyond the opening 34 in the cardboard envelope 22.

In FIGURE 5, the record has been inserted onto the folder or envelope 22 and the projecting ends 24 have been sealed at 26 and simultaneously cut so that the sealed and cut edge is about one-quarter inch from the cardboard; and FIGURE 6 shows a stack 28 of the record holders of FIGURE 5 and illustrates another advantage of the invention.

It is an acknowledged fact that many irregular surfaced products such as paint brushes, record envelopes, as well as soft goods such as towels, pillows, candy bags, heavy bulk materials like grain or flour, dry cleaners garment bags, etc. when placed into conventional display wrappings cannot be stacked on open shelves in quantity because of their tendency to slip and tumble. The peculiarly high interfacial friction of the instant irradiated polyethylene film can be used to advantage to overcome this disadvantage of other wraps.

Thus in FIGURE 6, the stack 28 of the laminated record holders will not tend to upset itself even though it may receive slight jars or vibrations while on the display shelves.

FIGURE 7 illustrates a single confectionery bar 30, wrapped in irradiated polyethylene film in accordance with this invention.

FIGURE 8 illustrates a stack 40 of confectionery bars illustrating, as does FIGURE 6, the advantages of stacking articles wrapped in accordance with this invention. The interfacial friction makes possible a steadier, more stable display of stacked articles.

The value of this particular stacking feature is more readily appreciated when it is realized that in order to overcome this disturbing problem of unsightly displays application of relatively expensive additives to the surfaces of the package wrapping materials have been employed.

These additives have the disadvantage of occasionally leaving an undesired whitish deposit.

In general, there is employed in the invention polyethylene film or tubing which has been irradiated to an extent of 2 to 100 megarads, preferably 6 to 20 megarads. The irradiation can be accomplished in conventional fashion, e.g., by the use of a high voltage resonant transformer, such as the 2,000,000 volt General Electric resonant transformer, or high energy particle generators of 50,000 to 50,000,000 volts or a Van de Graaf electron generator. In addition to the use of electrons, there can be employed beta rays, gamma rays, e.g., by employing cobalt 60, etc.

There can be employed any of the iradiation procedures disclosed in Colombian Patent 8,767 for example.

The biaxial orientation is normally carried out to an extent of 100 to 700% longitudinally and 100 to 900% laterally. The biaxial stretching can be carried out by blowing irradiated polyethylene tubing as disclosed in the Colombian patent. The irradiated, biaxially oriented polyethylene prepared by such a procedure has a high shrink energy, e.g. 100 to 500 p.s.i. at 96° C.

There can be employed as the starting polyethylene for the irradiation procedure high, low or medium density polyethylene prepared by low or high pressure technique. The starting polyethylene can have a molecular weight of 7,000 or 12,000 or 19,000 or 21,000 or 24,000 or 35,000 or even higher.

In place of irradiated polyethylene, there can be employed similarly irradiated polypropylene.

What is claimed is:

A stack of slippable articles free of restraint, each of said articles being packed in a film container or irradiated polyethylene, said irradiation being to an extent of at least 2 megarads, said film being laminated by an adhesive to an inner cover for each of said articles, said inner cover being made of a cellulose material, the tendency of the articles to slip being substantially reduced due to said container.

References Cited in the file of this patent

UNITED STATES PATENTS

| | | |
|---|---|---|
| 2,333,798 | Kner | Nov. 9, 1943 |
| 2,449,591 | Couse | Sept. 21, 1948 |
| 2,643,048 | Wilson | June 23, 1953 |
| 2,801,446 | Wolinski | Aug. 6, 1957 |
| 2,877,500 | Rainer et al. | Mar. 17, 1959 |

FOREIGN PATENTS

| | | |
|---|---|---|
| 1,125,803 | France | July 16, 1956 |

OTHER REFERENCES

62 "Chemical Engineering," pp. 228, 230, 232, 234, September 1955.